United States Patent
Mueller

[11] Patent Number: 5,848,689
[45] Date of Patent: Dec. 15, 1998

[54] OPTICAL DISC STORAGE CONTAINER WITH COMPRESSED HUB STRUCTURES

[75] Inventor: William R. Mueller, Clarks Summit, Pa.

[73] Assignee: WEA Manufacturing Inc., Olyphant, Pa.

[21] Appl. No.: 900,936

[22] Filed: Jul. 28, 1997

[51] Int. Cl.[6] .................................................. B65D 85/57
[52] U.S. Cl. .................... 206/308.1; 206/310; 206/493
[58] Field of Search .............................. 206/308.1, 309, 206/310, 312, 313, 493

[56] References Cited

U.S. PATENT DOCUMENTS

| | | | |
|---|---|---|---|
| 2,435,856 | 2/1948 | Weingert | 206/310 |
| 2,566,300 | 9/1951 | Adam | 206/310 |
| 2,663,419 | 12/1953 | Hirsch | 206/310 |
| 3,109,539 | 11/1963 | Turoff | 206/310 |
| 3,949,872 | 4/1976 | Paudras | 206/310 |
| 4,877,085 | 10/1989 | Grobecker et al. | 206/309 |
| 5,299,186 | 3/1994 | Tsurushima | 206/310 X |
| 5,586,651 | 12/1996 | Krummenacher | 206/310 |

*Primary Examiner*—Bryon P. Gehman
*Attorney, Agent, or Firm*—Fish & Neave; Robert R. Jackson; Walter M. Egbert

[57] ABSTRACT

A container for an optical disc such as a compact disc (CD) or digital versatile disc (DVD) has a bottom structure, a top structure movable relative to the bottom structure, and a hub structure projecting up from the bottom structure. With the lid open, the central aperture of the disc is easily placed on or removed from the hub. In this condition the hub structure centers the disc in the bottom of the container but does not retain the disc in the container. When the lid is closed, however, the lid causes the hub structure to radially enlarge and secure the disc. Reopening the lid allows the hub to return to the condition in which it does not retain the disc.

12 Claims, 2 Drawing Sheets

OPTICAL DISC STORAGE CONTAINER WITH COMPRESSED HUB STRUCTURES

BACKGROUND OF THE INVENTION

This invention relates to storage containers for optical discs such as compact discs (CDs) or digital versatile discs (DVDs).

Optical discs are typically contained in storage containers when they are not in use. The typical storage container has a centrally located hub which releasably engages an aperture in the center of the disc. This engagement is preferably secure enough so that the disc is not loose in the container. Secure engagement, however, can make it difficult for someone who wishes to use the disc to remove it from the container without flexing the disc. Such flexing may not be good for the disc because a high degree of disc flatness is required to satisfactorily play or read the disc. This is especially critical for DVDs, which are like two CDs adhered back to back and which have much greater information density than CDs.

In view of the foregoing, it is an object of this invention to provide improved storage containers for optical discs.

It is a more particular object of this invention to provide optical disc storage containers that avoid any possible flexing of the optical disc when the disc is being placed in or removed from the storage container.

SUMMARY OF THE INVENTION

These and other objects of the invention are accomplished in accordance with the principles of the invention by providing a storage container having a hub which cooperates with the lid of the container to radially enlarge to a size that engages an optical disc in the container when the lid is closed, and which radially contracts to a size that releases the optical disc when the lid is opened.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
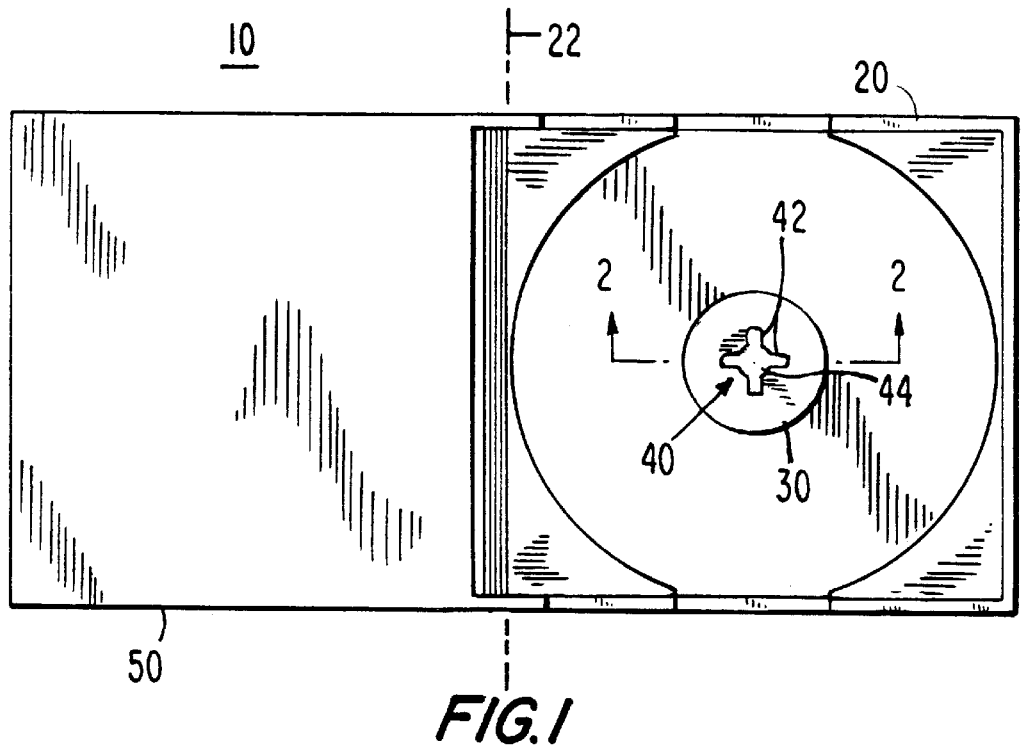
FIG. 1 is a simplified plan view of an illustrative embodiment of an optical disc container constructed in accordance with the invention.
Figure 2:
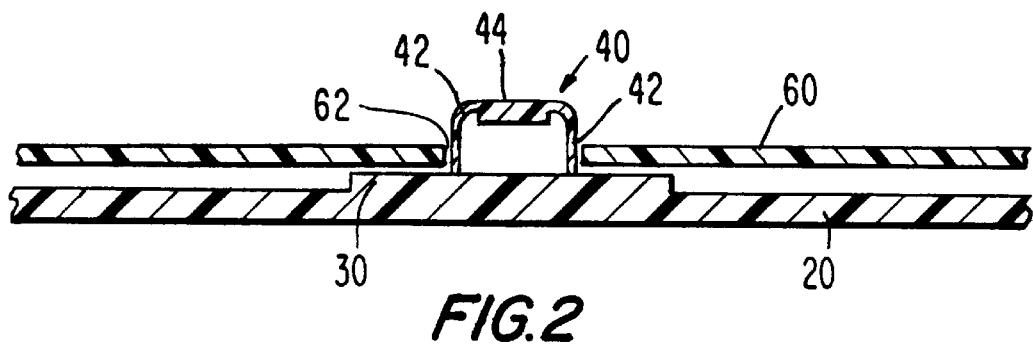
FIG. 2 is a partial sectional view taken along the line 2—2 in FIG. 1.

As shown in FIG. 1, illustrative optical disc storage container 10 includes a bottom portion 20 and a cover or lid portion 50 pivotally connected to bottom portion 20 at pivotal axis 22. Container 10 is shown open and empty in FIG. 1. The bottom of container 10 has a raised center portion 30. A hub structure 40 projects upwardly out of the center of center portion 30. In the relaxed condition shown in FIGS. 1 and 2, hub structure 40 is radially small enough to fit easily into the central aperture 62 in an optical disc 60 placed in container bottom 20. When a disc 60 is thus placed in the container bottom, a central annular portion of the disc is supported by raised center portion 30. The information-containing portion or portions of disc 60 are radially outward from the supported portion so that any abrasion of the disc surface that may result from contact with support 30 does not interfere with reading of the information contained on the disc. All of container 10 is preferably made of plastic. Lid portion 50 preferably releasably latches to bottom portion 20 when the lid portion is closed on the bottom portion.

Hub structure 40 includes a plurality of relatively light-weight (i.e, relatively small cross section) fingers 42 that extend up from raised portion 30 in an annular array. The upper portions of fingers 42 are bent in toward the center of the hub structure and are all connected to a central member 44 which is somewhat thicker than the fingers. As has been said, when hub structure 40 is in the relaxed condition shown in FIGS. 1 and 2, the annulus of fingers 42 fits easily into the central aperture 62 in an optical disc 60. In addition, the upper portions of relaxed fingers 42 and central member 44 extend well above the upper surface of an optical disc placed on the hub structure and resting on support portion 30.

Figure 3:
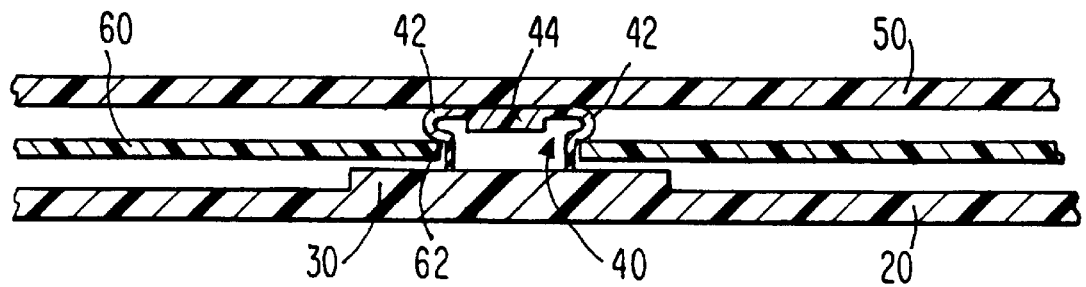
FIG. 3 is another view similar to FIG. 2 showing another operating condition of the apparatus.

When an optical disc 60 is placed on hub 40 as described above, and when the lid 50 of container 10 is closed over the disc and container bottom 20, lid 50 presses down on central member 44 and possibly also the upper portions of fingers 42 as shown in FIG. 3. This causes the upper portions of fingers 42 to bow radially outward over a small central portion of the upper surface of disc 60, thereby firmly securing the disc in place in the bottom of the container. In other words, closing lid 50 causes hub structure 40 to radially enlarge and securely grip disc 60. However, when lid 50 is reopened, hub structure 40 automatically returns to its originally relaxed condition shown in FIGS. 1 and 2. In this condition hub structure 40 does not in any way resist removal of disc 60. The disc can therefore be lifted up out of the bottom of container 10 with no flexing of the disc being either necessary or even inadvertently likely.

To recapitulate, when the lid 50 of container 10 is closed as shown in FIG. 3, hub structure 40 is radially enlarged by pressure from the lid. In this condition hub structure 40 holds disc 60 securely on support 30. As soon as lid 50 is opened, however, hub structure 40 automatically radially contracts to the condition shown in FIGS. 1 and 2. Hub structure 40 then no longer holds disc 60 in the bottom of the container and the disc can be removed without any significant force being applied to it.

Figure 4:
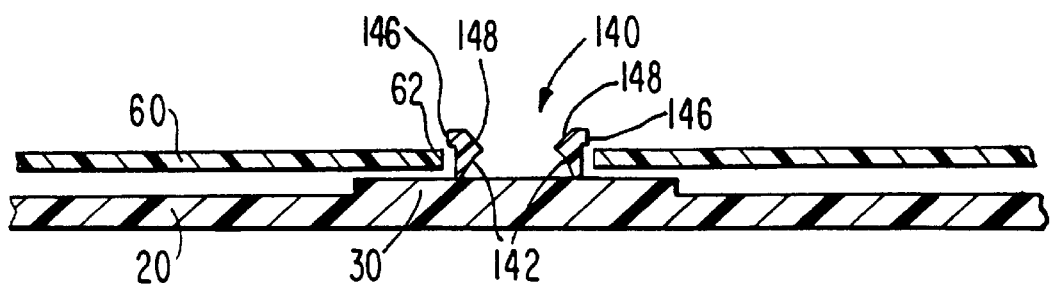
FIG. 4 is a view similar to FIG. 2 showing another illustrative embodiment of the invention.
Figure 5:
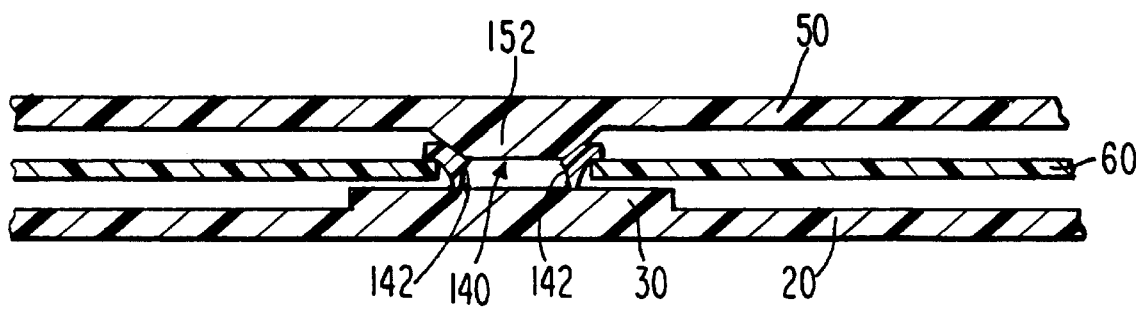
FIG. 5 is a view similar to FIG. 3 for the alternative embodiment shown in FIG. 4.

It will be understood that the foregoing is only illustrative of the principles of the invention and that various modifications can be made by those skilled in the art without departing from the scope and spirit of the invention. For example, FIGS. 4 and 5 show an alternative embodiment in which hub structure 140 comprises an annular array of fingers 142 extending upward from support 30 with no connection between the upper portions of the fingers. Each finger 142 has a radially outwardly projecting nose portion 146 and a radially inwardly located cam surface 148 on its upper portion. In the relaxed condition of the hub structure 140 shown in FIG. 4 no portion of the hub structure extends radially outward far enough to interfere with passage of the hub structure into or out of the central aperture 62 in disc 60. However, when container lid 50 is closed, a boss 152 on the inner surface of the lid engages cam surfaces 148 and thereby deflects fingers 140 radially outward as shown in FIG. 5. In this condition the nose portions 146 of fingers 142 extend out over the upper surface of disc 60, thereby causing the radially enlarged hub structure to firmly secure disc 60 in the bottom of the container. Reopening of lid 50 releases fingers 142 to return to their original relaxed condition as shown in FIG. 4, thereby releasing disc 60 from any engagement by hub structure 140.

The alternative shown in FIGS. 3 and 4 is just one example of possible modifications within the scope of the invention. Other examples include modifying the number of hub structure fingers 42 or 142, modifying the overall shape and/or material of the hub structure, adapting the shape of lid 50 to optimally operate the hub structure, etc.

The invention claimed is:

1. A container for removably containing an optical disc which has a central aperture, the container comprising:
   a bottom structure;
   a lid structure movable relative to the bottom structure; and
   a hub structure mounted on the bottom structure and receivable in the aperture, the hub structure being operable by the lid structure to compress the height thereof above the bottom structure, to radially enlarge, and to engage a disc in which the hub structure is received when the lid structure is closed on the bottom structure, and to radially contract and release a disc in which the hub structure is received when the lid structure is not closed on the bottom structure.

2. The container defined in claim 1 wherein a largest circular circumference defined by the hub structure when the hub structure is radially contracted is smaller than the circumference of the aperture.

3. The container defined in claim 2 wherein a largest circular circumference defined by the hub structure when the hub structure is radially enlarged is larger than the circumference of the aperture.

4. The container defined in claim 1 wherein the hub structure comprises:
   a plurality of fingers projecting up from the bottom structure in an annular array, portions of the fingers being deflected radially out from the center of the array when the hub structure is operated by closing the lid structure on the bottom structure.

5. The container defined in claim 4 wherein parts of the fingers are over the surface of the disc that faces away from the bottom structure when the portions of the fingers are deflected radially out.

6. The container defined in claim 1 wherein compressing the height of the hub structure increases the girth of the hub structure.

7. The container defined in claim 1 wherein closing the lid structure on the bottom structure spreads portions of the hub structure out from the center of the hub structure.

8. A container for removably holding an optical disc which has a central aperture, the container comprising:
   a bottom structure;
   a lid structure movable relative to the bottom structure; and
   a hub structure mounted on the bottom structure and receivable in the aperture, the hub structure configured to assume a first condition to engage a disc when the lid structure is closed on the bottom structure, and to automatically return to a second condition to release the disc when the lid structure is spaced apart from the bottom structure, the hub structure having an expanded radial dimension and a decreased height above the bottom structure when in the first condition relative to the second condition.

9. The container defined in claim 8 wherein a largest circular circumference defined by the hub structure when the hub structure is in the second condition is smaller than the circumference of the aperture.

10. The container defined in claim 9 wherein a largest circular circumference defined by the hub structure when the hub structure is in the first condition is larger than the circumference of the aperture.

11. The container defined in claim 8 wherein the hub structure comprises a plurality of fingers projecting up from the bottom structure in an annular array, portions of the fingers being deflected radially outward and downwardly towards the bottom structure when in the second position.

12. The container defined in claim 11 wherein portions of the fingers are positioned over a surface of the disc that faces away from the bottom structure when the portions of the fingers are deflected downwardly and radially out.

* * * * *